Feb. 5, 1935.   F. J. WELLER   1,990,393
HYDRAULIC PISTON
Filed Feb. 9, 1934
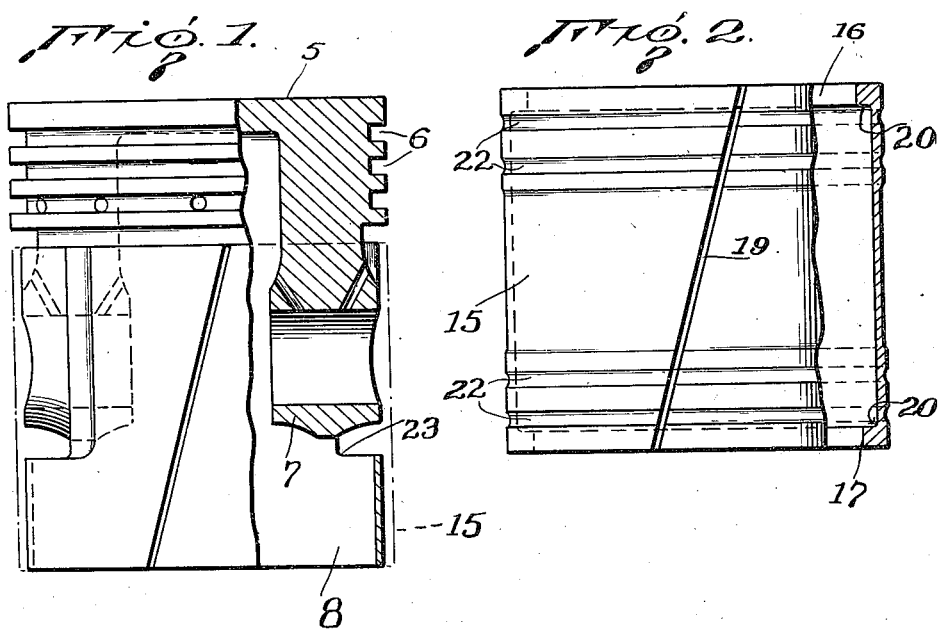
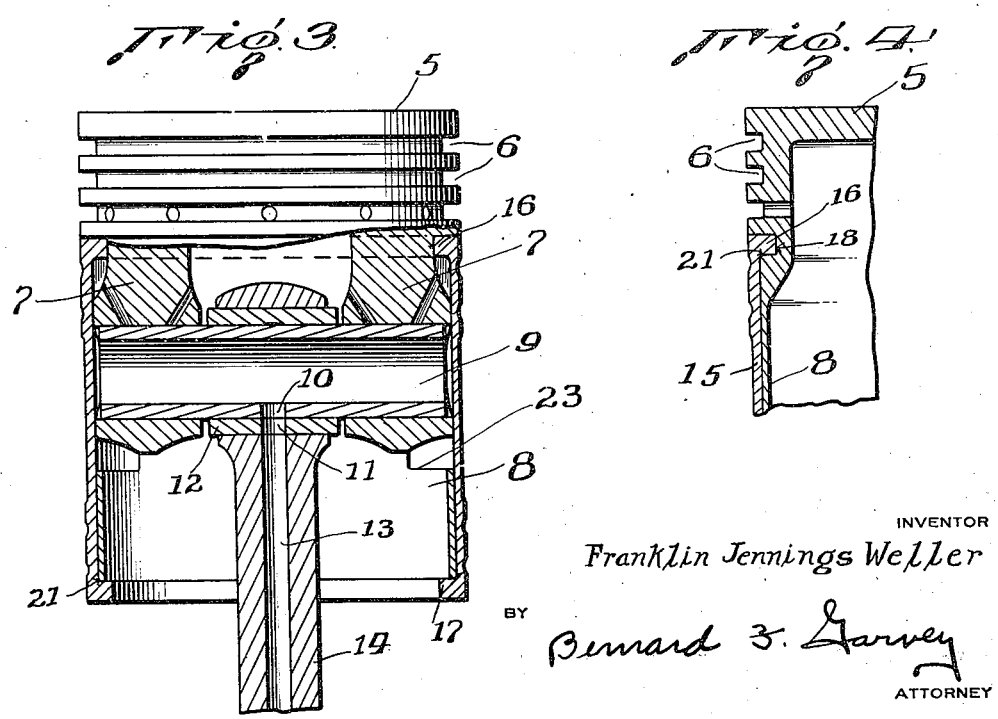
INVENTOR
Franklin Jennings Weller
BY Bernard F. Garvey
ATTORNEY Patented Feb. 5, 1935

1,990,393

UNITED STATES PATENT OFFICE 1,990,393

HYDRAULIC PISTON

Franklin Jennings Weller, Charles Town, W. Va.

Application February 9, 1934, Serial No. 710,567

2 Claims. (Cl. 309—12)

The present invention consists of a hydraulic piston, an object of which is to effect automatic expansion of the piston completely around the zone of the wrist pin to constantly maintain the piston truly centered in the cylinder bore and eliminate piston slaps and like defects caused by eccentric piston action.

It is well-known in the art to equip pistons with various attachments designed to insure piston stability, which have been instrumental in minimizing lateral thrust and like eccentric actions responsible for damage to the cylinder walls. These attachments are characterized by a dead expansion, devoid of flexibility. Within the contemplation of the present invention, eccentric movement of the piston is positively restrained by a flexible expansion action of the piston, which correspondingly eliminates piston rocking and slapping, increases compression, and reduces oil consumption to a minimum.

In high speed motors it is essential that the piston weight be held to a minimum and I have so constructed the component parts of my piston that no increase in weight entails, yet a hydraulic action prevails which prevents the piston rings from wearing round; correspondingly prevents uneven wear on the cylinder walls, and automatically takes up all normal cylinder wear.

Other objects of my invention will be apparent from the following description of the present preferred form thereof, taken in connection with the accompanying drawing, wherein Fig. 1 is a side elevational view, partly in section, of a piston showing in dotted lines the sleeve of the present invention;

Fig. 2 is a side elevational view, partly in section, of an expansion sleeve forming a part of the piston made in accordance with my invention;

Fig. 3 is a side elevational view of a complete piston assembly made in accordance with this invention, the inner end of which is in longitudinal section, to disclose details of the invention; and Fig. 4 is a detailed, fragmentary sectional view illustrating to advantage the manner of engaging the piston sleeve of the present invention with the piston body.

In the drawing, I prefer to employ a piston body 5, of substantially conventional design, the head of which is provided with the customary ring grooves 6. The head issues into wrist pin bosses 7, in a manner well-known in the art. A piston skirt 8, likewise of conventional design, is also employed. However, in the present instance, the outer periphery of the skirt 8 lies appreciably within the vertical plane of the periphery of the piston head, as illustrated to advantage in Figs. 1, 3 and 4.

A wrist pin 9 is mounted in the bosses 7, the terminals of which preferably fall short of tne outer extremities of the bosses. The pin is provided with a bore, which communicates with an opening 10, arranged approximately midway the ends of the pin. The opening 10, in turn, communicates with an opening 11 in the connecting-rod bearing 12, and also with a central bore 13, in the connecting rod 14. It will be apparent that oil forced through the bore 13 of the connecting rod, will pass uninterruptedly through the openings 10 and 11 into the wrist pin bore 9 through the ends of which it passes for a purpose which will presently appear.

Concentrically mounted on the skirt 8 of the piston is an expansion sleeve 15, in the present instance shown to be of cylindrical configuration so as to complement the skirt; the opposite ends thereof being thickened and bent inwardly at right angles to provide parallel, annular flanges, the upper of which is indicated at 16 and the lower at 17. The upper flange 16 corresponds to and is engageable in a groove 18, formed in the outer periphery of the piston body at approximately the juncture of the piston head and skirt. The lower flange 17 abuts the free inner terminal of the skirt 8 and extends inwardly appreciably beyond the latter, as shown in Fig. 3 of the drawing. It will be noted, especially upon reference to Fig. 2 of the drawing, that the sleeve 15 is diagonally split, as indicated at 19, to permit expansion of the sleeve, allowing the latter to be flexed over the skirt 8, and the flanges 16 and 17 sprung into their proper positions, as above described and shown in Fig. 3. To reduce wear on the sleeve to a minimum, the inside angles at the juncture of the flanges 16 and 17 with the sleeve body, are rounded as indicated at 20, the corners 21 at the opposite ends of the piston skirt being correspondingly rounded.

Preferably the sleeve is provided at intervals with oil grooves 22, which circumscribe the sleeve.

The device of the present invention is adapted for use with either a forced feed or splash system of lubrication in automobiles. Where the force feed system is employed, the oil is passed through the bore 13 of the piston connecting rod, under a predetermined pressure, and through the outer terminals of the wrist pin 9 for impingement against the inner wall of the sleeve 15.

The pressure of oil on the sleeve is sufficient to urge the latter into positive, but light engagement with the cylinder wall. The oil, after leaving the ends of the wrist pin, seeps between the outer periphery of the skirt 8 and the inner wall of the sleeve 15, being pocketed or trapped there by the flanges 16 and 17. By slightly spacing the terminals of the wrist pin from the outer faces of the bosses 7, habitats for the oil are provided between the wrist pin terminals and the sleeve.

Where the splash system of lubrication is employed, the lubricant, in passing into the piston in the usual manner, finds its way through skirt openings 23 and also through the lubricant passageways of the bosses 7 for engagement with the sleeve 15, constantly urging the latter outwardly against the cylinder wall during the operation of the engine. The force feed system is preferable, however, in that pressure control attains at all times and the oil pressure is localized to the desired zones on the sleeve.

Although I have herein shown and described the preferred form of my invention, it is to be understood that various changes, especially in the construction, proportion and arrangement of parts, may be made within the scope of the appended claims.

What is claimed is:

1. In combination with a piston, one end of which is formed to provide ring grooves and lands, a skirt portion on the opposite end of the piston; and a sleeve mounted on and surrounding said skirt in close proximity thereto and engaged over both terminals of the latter to provide a trap between the skirt and the sleeve, the said skirt being provided with oil inlet openings communicating with said trap from within the piston, whereby oil may be introduced under pressure through said openings for expanding the sleeve.

2. In combination with a piston, one end of which is formed to provide ring grooves and lands, a skirt portion on the opposite end of the piston, and a sleeve fitted on said skirt portion and extending across the wrist pin bosses of the piston, the terminals of the sleeve being engaged over the opposite ends of the skirt to provide an oil trap between the sleeve and skirt, whereby oil may be introduced under pressure through said bosses and into the oil trap for expanding the sleeve.

FRANKLIN JENNINGS WELLER.